Nov. 21, 1961

L. GUAY 3,009,512

METHOD AND MEANS FOR FORMING RIBBON
COMPOSED OF SEPARABLE EXTRUDED
RUBBER THREADS

Filed May 29, 1957

INVENTOR.
LEONARD GUAY
BY
*Max Schwartz*
ATTORNEY

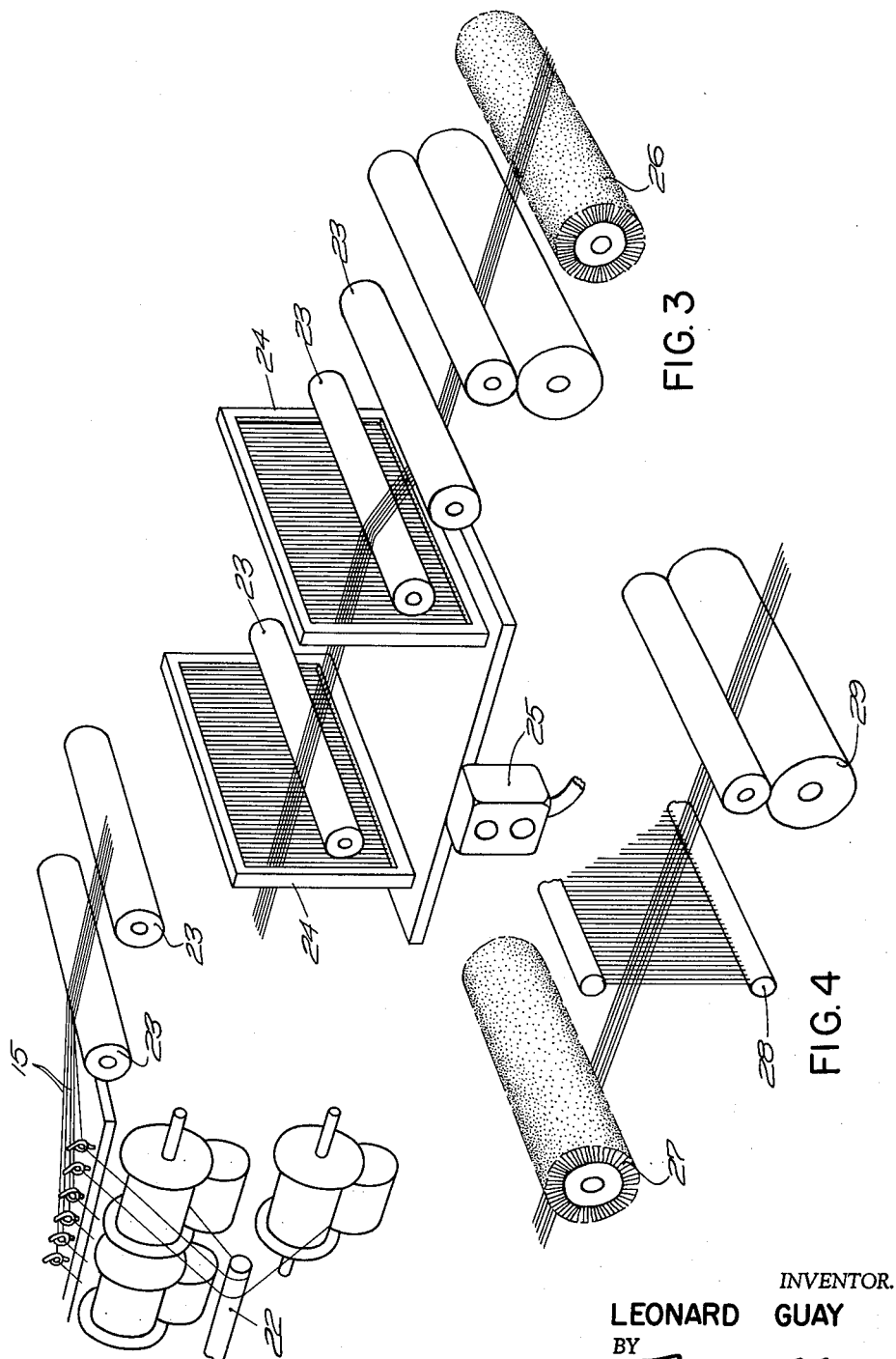

Nov. 21, 1961   L. GUAY   3,009,512
METHOD AND MEANS FOR FORMING RIBBON
COMPOSED OF SEPARABLE EXTRUDED
RUBBER THREADS
Filed May 29, 1957   3 Sheets-Sheet 3
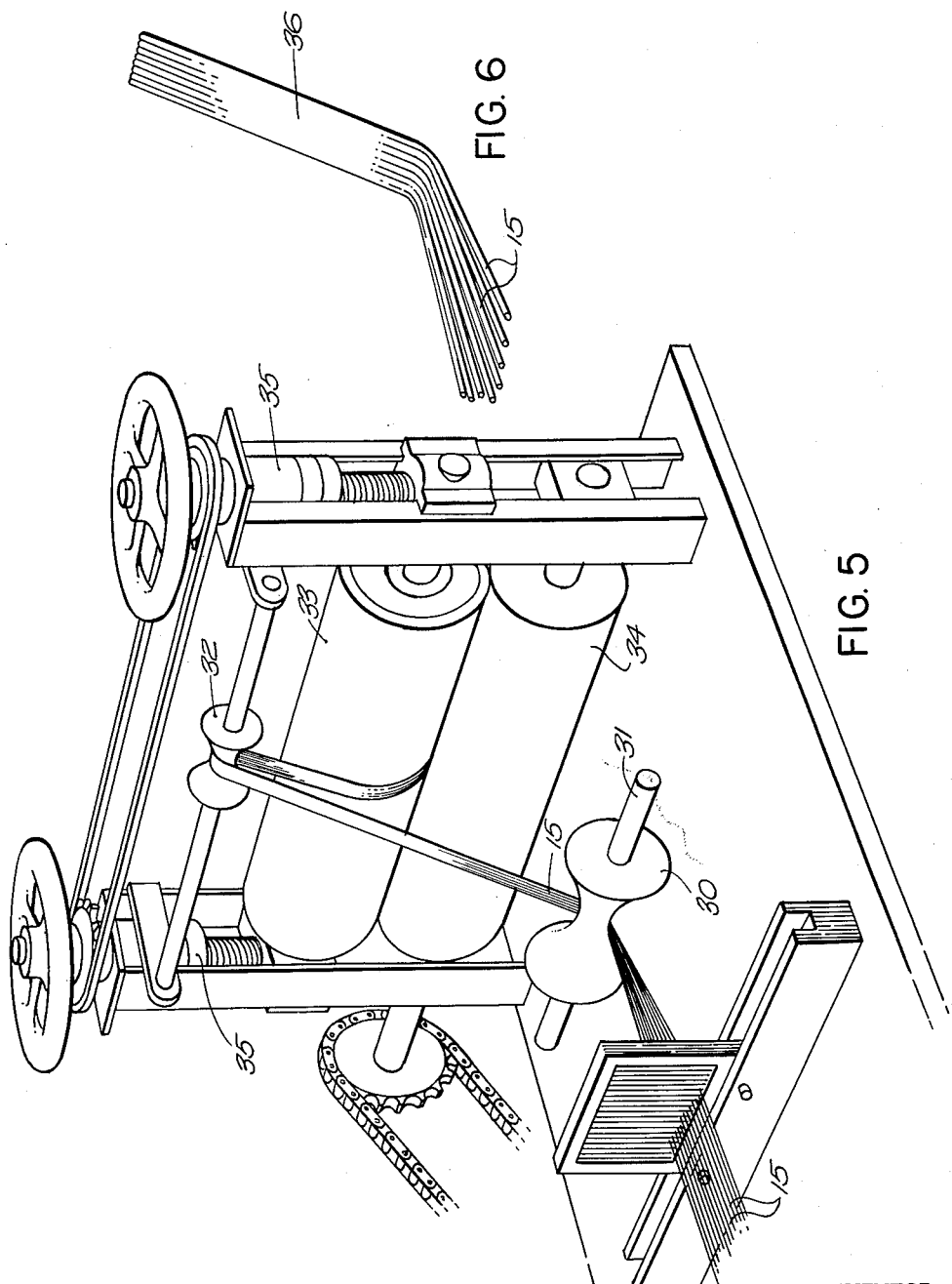
INVENTOR.
LEONARD GUAY
BY
ATTORNEY

United States Patent Office 3,009,512
Patented Nov. 21, 1961

3,009,512
METHOD AND MEANS FOR FORMING RIBBON COMPOSED OF SEPARABLE EXTRUDED RUBBER THREADS
Leonard Guay, Fall River, Mass., assignor to Precision Thread Co., Inc., Fall River, Mass., a corporation of Massachusetts
Filed May 29, 1957, Ser. No. 662,398
4 Claims. (Cl. 156—161)

My present invention relates to a tape or ribbon composed of a plurality of extruded rubber threads lightly stuck together so that they can be readily separated and to a method and means of making the same.

The principal object of the present invention is to provide a method and means of causing the extruded threads to stick together in such manner that they will separate very easily.

Another object of the present invention is to provide a ribbon of extruded rubber threads in which the threads will separate without forming a web so that the individual threads remain smooth and perfectly formed.

Another objeect of the present invention is to provide a method and apparatus for forming ribbons of extruded rubber threads in which the existing methods of forming the rubber thread can be utilized without changes.

A further object of the present invention is to provide a method and means for forming ribbons of extruded thread which permit careful inspection of the individual threads and thus virtually eliminates rejections and scrap.

Another object of the present invention is to provide a method and means of forming ribbons of extruded thread which utilizes a simple and inexpensive apparatus which can be added to the conventional extruded thread forming system.

With the above and other objects and advantageous features in view, my invention consists of a novel arrangement of parts and a novel method of manufacture more fully set forth in the detailed description following, in conjunction with the accompanying drawings, and more particularly defined in the appended claims.

In the drawings,

FIGS. 1 and 2 schematically illustrate the process and apparatus for forming extruded ribbon thread.

FIGS. 3 and 4 are perspective views showing the letoff system, inspection, and brushing devices.

FIG. 5 is a perspective view, partially broken, of the ribbon forming apparatus.

FIG. 6 is a perspective view of a portion of the finished ribbon formed from extruded thread.

Figure 1:
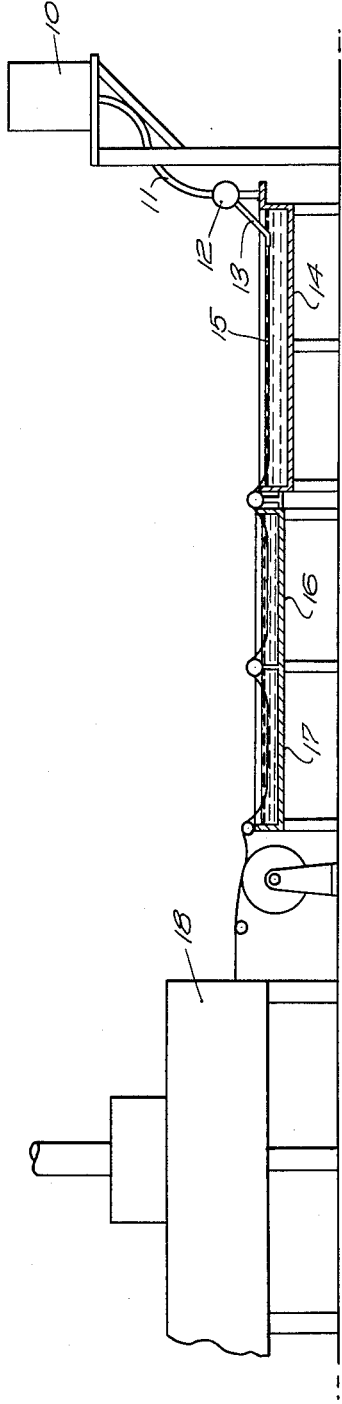

In the handling of extruded rubber threads it has been found that the winding of the finished threads on cones or spools, and the necessity of using a multiplicity of such spools in the covering machines, retards production and increases the cost. It has therefore been proposed to form such threads into ribbons, the number of threads to the ribbon depending on the requirements of the user and the number of ends to be fed simultaneously into the braiding or covering machine. In this manner the spools are eliminated, packaging is easier and a great deal of time and labor is saved.

The general methods of forming the extruded thread into ribbon have been employed. One method, illustrated in Alderfer Patent No. 2,380,373 utilizes an adhesive to hold the threads in the form of a ribbon. This method has been found objectionable because the various portions of the covering apparatus become fouled with the adhesive which scrapes off the thread. In the finer diameters which pass through small openings the adhesive clogs the openings and causes the thread to break. Another method is illustrated in Slovin Patent No. 2,678,-676. This patent illustrates an apparatus in the form of a vertical stack of rollers and conveyor belts. The newly formed extruded thread is fed into the apparatus and partially cured. At this stage it is led outside, formed into a ribbon by a concave roller and back into the apparatus for final curing, the finished ribbon emerging at the bottom. This system has many defects. It originally requires the building of a special and expensive apparatus. The threads are adhered to each other and then cured with the result that tack control and convenient inspection prior to vulcanization are difficult. A thin continuous web of rubber forms between the threads which leaves a ragged edge on the threads after separation.

The method and apparatus of the present invention eliminates the various objections to both of these systems. The present invention utilizes the existing facilities for forming extruded rubber thread with the addition of a simple apparatus for forming the thread into a ribbon. The applicant's process is based on principles not utilized in the existing art. For example, it is customary in the manufacture of extruded rubber thread to cover the partially cured thread with talc to remove the tackiness so that it can be wound on spools and placed in the oven for the final curing operation. It would thus be foreign to the teachings of the art as exemplified in the above noted patents to use dry talc on dried extruded threads to be formed into ribbons. However, the applicant has found that by leaving a coating of talc on the extruded threads and applying pressure to the threads, under tension, sufficient adhesion will occur to hold the threads in ribbon form for shipping and handling. The applicant has found that a ribbon so formed will separate easily and with little effort. No continuous web will be formed between the threads and each thread will be individually in perfect condition due to the protective coating of the talc. This method permits a careful inspection of the individual threads. Furthermore, the apparatus for forming the ribbon is simple and does not disrupt the normal extrusion process since it is an addition thereto. By the use of the present method the plant can take the threads as initially formed and either ship them in spools or form them into ribbons as required by the customer. There is thus a considerable saving in the initial investment for the apparatus and in the operation of the plant.

Figure 2:
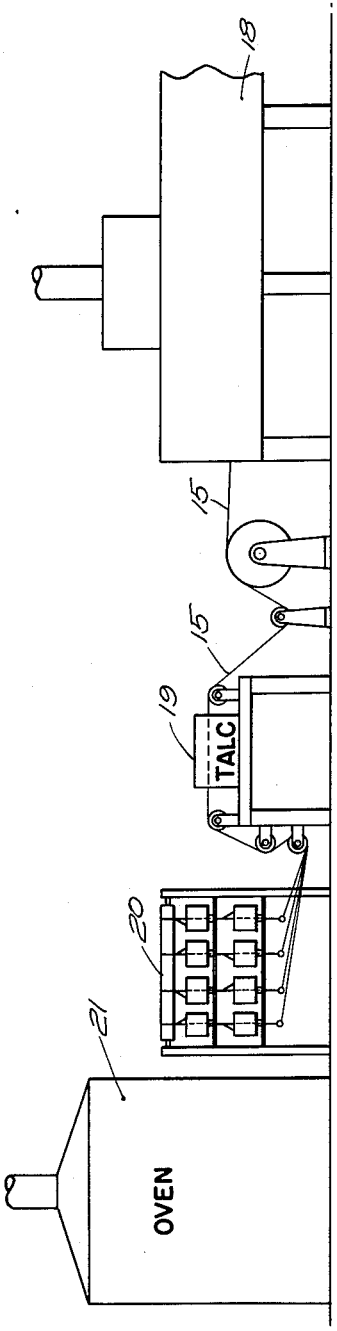

Referring more in detail to the drawings, FIGS. 1 and 2 illustrate the process for forming the extruded thread. The liquid latex flows from the raised tank 10 through the hose 11 into a manifold 12 having a plurality of capillary tubes 13 which extend into the tank 14 holding the coagulating liquid. The threads 15 form in the tank 14 and passes into two wash tanks 16 and 17 and into an elongated oven 18. The oven 18 dries and partially cures the threads, the degree of curing being between three and five percent. At this stage the threads 15 are extremely tacky. They are then passed through an apparatus 19 which coats them with talc to eliminate the tackiness and from there they pass to a frame 20 where they are wound on spools. At this point the threads can be positioned in the oven 21 to complete the curing and rewound from a letoff machine on to spools for shipment to the customer.

In accordance with the present invention the spools of partially cured, talc covered, extruded threads are mounted on a letoff device 22 as shown in FIGS. 3 and 4. At this point the composition of the finished ribbon is predetermined. The customer will request a ribbon having a certain number of threads. The threads 15 in the required number will be passed in spaced parallel relation over a plurality of rollers 23 and between two spaced comb members 24 where they will be visible for inspection. At this point a switch 25 is provided for starting and stopping the mechanisms. The inspector carefully watches the threads and can immediately stop the apparatus at the slightest sign of a defect. The defective thread can then be removed and a new thread tied into place. This inspection step is of importance to the economical manufacture of the final product. The final ribbon or tape may contain thirty or forty threads. One defective thread may ruin the entire ribbon.

After the inspection the threads 15 pass over a brush 26 and under a brush 27. These brushes serve to remove the loose particles of excess talc from the threads leaving only a light coating of talc stuck to the tacky surface of the threads. The threads then pass through a separating comb 28 and rollers 29 to the ribbon forming apparatus shown in FIG. 5.

Referring to FIG. 5, the threads 15 pass beneath a forming roller 30 mounted on a shaft 31. The roller 30 has a concave surface which is smooth and highly polished. As the threads 15 pass beneath the roller under tension they are gathered into contiguous relation. They then pass over a similar smaller roller 32 and then beneath a pair of pressure rollers 33 and 34. The lower roller 34 is power driven. The upper roller 33 is provided with a device 35 at each end for increasing or decreasing the pressure. The pressure of the rollers 33 and 34 force the threads into contact with each other enough to cause them to adhere sufficiently to form the ribbon 36. Since the excess talc has been brushed off the threads 15, sufficient tackiness exists on the tensioned surface to cause a cohesive action of the tacky surfaces through said talc sufficient to hold the pressed threads in ribbon form. The surface of the threads being covered with talc, they will easily part and separate without deforming or tearing the individual threads.

It should be noted at this point that the illustration in FIG. 5 shows the manufacture of a single ribbon. The apparatus shown therein can be provided with a plurality of forming rollers 30 and 32 in side by side relation so that a plurality of ribbons can be formed at the same time.

The ribbon 36 can now be taken off either on a beam or in a carton and the curing of the threads completed in the oven 21, or in a similar oven which can be provided adjacent the forming apparatus. The applicant has found that the talc covered thread can be formed into a ribbon under pressure even if only a slight tackiness remains in the surface. Thus the threads can be placed in the oven 21 at the end of the portion of the process shown in FIGS. 1 and 2 and cured to within ninety percent of complete cure. After the formation of the ribbon there will then be required only a ten percent curing operation. Where the threads are partially cured before being formed into the ribbon greater pressures will be required. However, partial curing permits easier handling of the threads with less danger of distortion or breaking.

The present invention thus provides a method of forming extruded rubber thread into ribbon or tape by covering the thread with talc, removing the excess talc, gathering the threads under tension into contiguous relation, applying pressure and completing the cure. The apparatus required in addition to the conventional extrusion system is simple in construction and easy and economical to manufacture and assemble. The finished product has been found to be greatly superior in ease of handling, ease of separation, and retention of quality than any of the systems of forming such ribbons now in use. Other advantages of the present invention will be readily apparent to a person skilled in the art.

The effectiveness of the present invention is believed to be explained as follows. While the dried, incompletely vulcanized threads are talced to eliminate or mask substantially completely the surface tack of the threads at the talcing station, they are thereafter tensioned to stretch the threads so as to expose small unconnected tacky areas on the thread surfaces which are brought together by the concave gathering roll and pressed into adhering contact by the pressure rolls which compress the embryo ribbon from directly opposed sides.

It should be understood that the foregoing description is for the purpose of illustration only and that the invention includes all modifications falling within the scope of the appended claims.

I claim:
1. The method of forming a flat ribbon composed of a plurality of extruded rubber threads separably stuck together, said method comprising as steps:

forming a plurality of extruded rubber threads,
initially drying said threads to a tacky, incompletely vulcanized condition,
thereafter coating the entire surface of said dried threads with substantially dry talc to remove the surface tack thereof,
thereafter tensioning said threads, bringing said threads while under said tension into side-by-side contiguous position to form said ribbon,
applying transverse pressure from directly opposed sides to said ribbon while under said tension separably to adhere the thread in ribbon form, and
thereafter completing vulcanization of the ribbon.

2. The method according to claim 1, wherein said dry threads are brushed after talcing to remove loose particles of talc prior to bringing said threads together to form said ribbon.

3. Apparatus for forming a flat ribbon composed of a series of extruded rubber threads separably stuck together, said apparatus comprising:

means for forming a plurality of extruded rubber threads and for drying said threads to a tacky, incompletely vulcanized condition,
means for coating the entire surface of said dry threads with talc to remove the surface tack thereof,
means for thereafter applying tension to said talced threads,
means for urging said threads, while under said tension, toward each other in side-by-side abutting contact to form a ribbon,
a pair of opposed pressure rolls adapted to apply transverse pressure on said ribbon passing therebetween while under said tension, and
means for completing vulcanization of the threads.

4. Apparatus according to claim 3, further characterized by brush means for removing loose particles of excess talc.

References Cited in the file of this patent
UNITED STATES PATENTS

| | | |
|---|---|---|
| 2,082,744 | Shaw | June 1, 1937 |
| 2,246,917 | Francis | June 24, 1941 |
| 2,323,132 | Hazell | June 29, 1943 |
| 2,333,699 | Brosi | Nov. 9, 1943 |
| 2,481,060 | Alderfer et al. | Sept. 6, 1949 |
| 2,678,676 | Slovin | May 18, 1954 |